US009882217B2

United States Patent
Lee et al.

(10) Patent No.: US 9,882,217 B2
(45) Date of Patent: Jan. 30, 2018

(54) NEGATIVE ELECTRODE SLURRY COMPOSITION, AND NEGATIVE ELECTRODE AND LITHIUM BATTERY INCLUDING THE NEGATIVE ELECTRODE SLURRY COMPOSITION

(71) Applicant: SAMSUNG SDI CO., LTD., Yongin-si, Gyeonggi-do (KR)

(72) Inventors: Sora Lee, Yongin-si (KR); Dukhyoung Yoon, Yongin-si (KR); Hyeri Eom, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/920,911

(22) Filed: Oct. 23, 2015

(65) Prior Publication Data

US 2016/0141624 A1 May 19, 2016

(30) Foreign Application Priority Data

Nov. 19, 2014 (KR) .......................... 10-2014-0161623

(51) Int. Cl.
*H01M 4/62* (2006.01)
*H01M 4/13* (2010.01)
*H01M 4/36* (2006.01)
*H01M 4/38* (2006.01)
*H01M 4/587* (2010.01)
*H01M 10/052* (2010.01)

(52) U.S. Cl.
CPC ............... *H01M 4/62* (2013.01); *H01M 4/13* (2013.01); *H01M 4/364* (2013.01); *H01M 4/366* (2013.01); *H01M 4/386* (2013.01); *H01M 4/625* (2013.01); *H01M 4/587* (2013.01); *H01M 10/052* (2013.01)

(58) Field of Classification Search
CPC ........ H01M 4/62; H01M 4/366; H01M 4/386; H01M 2004/027; H01M 2220/20; H01M 2220/30
USPC .......................................................... 252/500
See application file for complete search history.

(56) References Cited

U.S. PATENT DOCUMENTS

| 2011/0039163 A1* | 2/2011 | Deguchi ............... H01M 4/133 429/330 |
| 2011/0165464 A1* | 7/2011 | Yew ...................... H01M 4/134 429/223 |
| 2011/0256442 A1 | 10/2011 | Kageira et al. | |

FOREIGN PATENT DOCUMENTS

| JP | 2010-170993 A | 8/2010 |
| JP | 2011-076741 A | 4/2011 |

(Continued)

OTHER PUBLICATIONS

Magasinski et al. "Toward Efficient Binders for Li-Ion Battery Si-Based Anodes: Polyacrylic Acid". Applied Materisl & Interfaces. vol. 2 No. 11 3004-3010. Published on Web Nov. 5, 2010. Total pp. 7.*

(Continued)

*Primary Examiner* — Harold Pyon
*Assistant Examiner* — Danny N Kang
(74) *Attorney, Agent, or Firm* — Lee & Morse, P.C.

(57) ABSTRACT

A negative electrode slurry composition includes a negative active material, a binder, and a dispersant. The dispersant includes a polyacrylic acid (PAA) having a weight average molecular weight (Mw) greater than 10 and less than 10,000. A negative electrode and a lithium battery include the negative electrode slurry composition.

13 Claims, 10 Drawing Sheets

(56) References Cited

FOREIGN PATENT DOCUMENTS

KR 10-2007-0110569 A 11/2007
KR 10-1093698 B1 12/2011

OTHER PUBLICATIONS

Magasinski, et al., "Toward Efficient Binders for Li-Ion Battery Si-Based Anodes: Polyacrylic Acid", 2010, American Chemical Society.

* cited by examiner

NEGATIVE ELECTRODE SLURRY COMPOSITION, AND NEGATIVE ELECTRODE AND LITHIUM BATTERY INCLUDING THE NEGATIVE ELECTRODE SLURRY COMPOSITION

CROSS-REFERENCE TO RELATED APPLICATION

Korean Patent Application No. 10-2014-0161623, filed on Nov. 19, 2014, in the Korean Intellectual Property Office, and entitled: "Negative Electrode Slurry Composition, and Negative Electrode and Lithium Battery Including the Negative Electrode Slurry Composition," is incorporated by reference herein in its entirety.

BACKGROUND

1. Field

Embodiments relate to a negative electrode slurry composition, and a negative electrode and a lithium battery that include the negative electrode slurry composition.

2. Description of the Related Art

A lithium secondary battery includes a positive electrode and a negative electrode, which each include an active material and allow for intercalation and de-intercalation of lithium ions, and an organic electrolyte or a polymer electrolyte between the positive electrode and the negative electrode. The lithium secondary battery produces electric energy through an oxidation-reduction process taking place when the lithium ions are intercalated/de-intercalated to and from the positive electrode and the negative electrode.

SUMMARY

Embodiments are directed to a negative electrode slurry composition including a negative active material, a binder, and a dispersant. The dispersant includes a polyacrylic acid (PAA) having a weight average molecular weight (Mw) greater than 10 and less than 10,000.

The polyacrylic acid may have a weight average molecular weight in a range from about 1,000 to about 7,000.

The polyacrylic acid may be present in an amount of from about 0.01 wt % to about 2 wt % of the total weight of the negative electrode slurry composition.

The polyacrylic acid may be present in an amount of from about 0.3 wt % to about 0.9 wt % of the total weight of the negative electrode slurry composition.

The negative active material may include a metal-based core and a carbonaceous coating layer on the metal-based core.

The metal-based core may be at least one selected from Si, SiO$_x$ (0<x<2), a Si—Y alloy (where Y is an alkali metal, an alkali earth metal, a Group 13 element, a Group 14 element, a transition metal, a rare earth metal, or a combination thereof, and is not Si), Sn, SnO$_2$, a Sn—Y alloy (where Y is an alkali metal, an alkali earth metal, a Group 13 element, a Group 14 element, a transition metal, a rare earth metal, or a combination thereof, and is not Sn), and a combination thereof.

The metal-based core may include silicon (Si).

An average particle diameter of the metal-based core may be 1 μm or less.

An average particle diameter of the metal-based core may be in a range from about 10 nm to about 300 nm.

The carbonaceous coating layer may include an amorphous carbon.

The negative active material may further include a carbonaceous material.

The negative active material may be present in an amount of from about 50 wt % to about 99.5 wt % of a total weight of the negative electrode slurry composition.

A total amount of the metal-based core and the carbonaceous coating layer may be in a range from about 1 wt % to about 99 wt % of the total weight of the negative electrode slurry composition.

A negative electrode may include a negative electrode mixture layer that is formed from the negative electrode slurry composition.

A lithium battery may include the negative electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
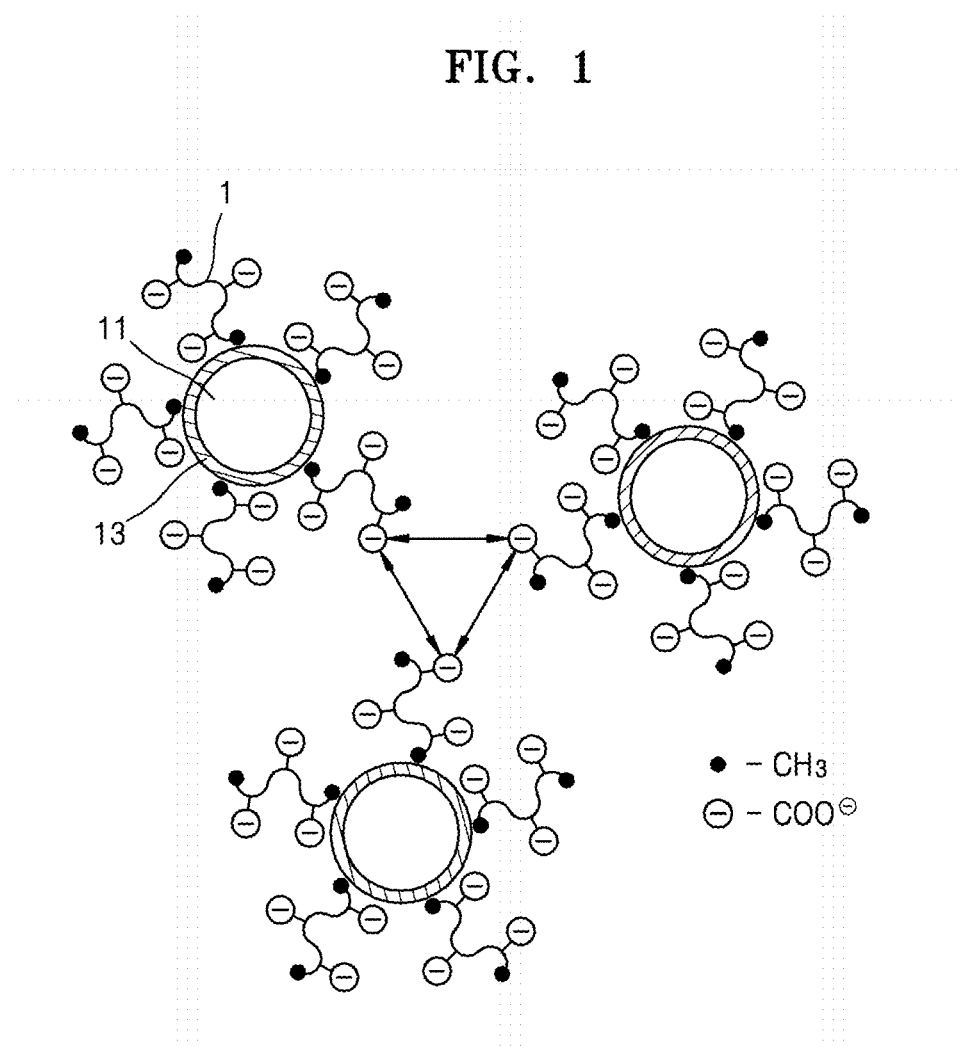
FIG. 1 illustrates a schematic view depicting dispersion of polyacrylic acids (PAAs)

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

As used herein, the term "and/or" includes any and all combinations of one or more of the associated listed items. Expressions such as "at least one of" when preceding a list of elements, modify the entire list of elements and do not modify the individual elements of the list.

It is desirable that particles of a negative active material, e.g., silicon or tin, be evenly dispersed in a negative electrode slurry composition, so as to provide capacity of the negative active material. However, due to the occurrence of aggregation of the particles, it may be difficult to provide a desired volume and control volume expansion during charging and discharging. A carbonaceous active material that is frequently used as a negative active material may have a high hydrophobicity, and thus, may have low wettability with respect to a hydrophilic solvent that is used in preparing a slurry. Accordingly, the even dispersion of the particles of the negative active material may be difficult. Therefore, to prevent degradation of a battery performance, a method of improving the dispersibility of the particles of the negative active material is desirable.

A negative electrode slurry composition according to an embodiment may include a negative active material, a binder, and a dispersant. In the negative electrode slurry composition, the dispersant may include a polyacrylic acid (PAA) having a weight-average molecular weight greater than 10 and less than 10,000. The polyacrylic acid may be any polymerized acrylic acid. The polyacrylic acid does not contain any polymerized (meth) acrylate.

PAA is a polymer having a methyl group at both terminals of the polymer and a carboxyl group in a repeating unit of a main chain of the polymer. The PAA may be mixed with the negative electrode slurry composition to be physically absorbed on a surface of a negative active material having hydrophobicity. The methyl group of the PAA may be physically absorbed on a surface of a particle of the negative active material having hydrophobicity due to van der Waals forces. In addition, the PAA in an aqueous solution may have a negative charge as a proton of the carboxyl group is desorbed therefrom. The particle of the negative active material may be surrounded by the methyl groups of the PAA in the negative electrode slurry composition, and accordingly, a repulsive force between carboxylate anions of the PAA having a negative charge may be generated. The particles of the negative active material may be evenly dispersed in the negative electrode slurry composition without aggregation of the particles.

In the negative electrode slurry composition, the weight-average molecular weight of the PAA may be less than 10,000. When the PAA has a weight-average molecular weight of less than 10,000, the PAA may help with the dispersion of the particles of the negative active material in the negative electrode slurry composition by surrounding the particles. If the PAA were to have a weight-average molecular weight of 10,000 or more, the PAA could act as a binder, rather than as a dispersant, in the negative electrode slurry composition, and accordingly, may not significantly influence the dispersion of the particles of the negative active material. A PAA having a weight-average molecular weight of 10,000 or more may be generally present in a random manner among constituents of a negative electrode, rather than being absorbed on a surface of the particle of the negative active material. In this regard, the PAA having a weight-average molecular weight of 10,000 or more may be used as a binder in terms of combining the ingredients and having a function to adhere a negative electrode mixture layer onto a surface of a current collector.

In an exemplary embodiment, the weight-average molecular weight of the PAA may be greater than 10 and less than 10,000. Within this range, the PAA may further enhance the dispersion effect. The PAA may have a weight-average molecular weight in a range from, for example, about 1,000 to about 7,000, or, for example, about 2,000 to about 5,000.

The amount of the PAA in the negative electrode slurry composition may be in a range from about 0.01 weight percent (wt %) to about 2 wt % of the total weight of the negative electrode slurry composition. Within this range, the PAA may further enhance the dispersion effect and may effectively depress plate expansion that may be caused by the aggregation of components of the slurry. The amount of the PAA in the negative electrode slurry composition may be, for example, in a range from about 0.3 wt % to about 0.9 wt % of the total weight of the negative electrode slurry composition.

In the negative electrode slurry composition, the dispersant may further include, in addition to the PAA, another material having a weight-average molecular weight greater than 10 and less than 10,000. Examples of the other material include polyvinylalcohol (PVA), polyimide (PI), polyamideimide (PAI), polyacrylonitrile (PAN), or a combination thereof.

In the negative electrode slurry composition, the negative active material may include a metal-based core and a carbonaceous coating layer disposed on the metal-based core.

The negative active material may further include a carbonaceous material.

The dispersion action of the PAA according to an exemplary embodiment is illustrated in FIG. 1. As shown in FIG. 1, a metal-based core 11, on which a carbonaceous coating layer 13 is disposed, may be surrounded by the methyl groups of the PAA 1. Due to hydrophobicity of the carbonaceous coating layer 13, the carbonaceous coating layer 13 may attract the methyl groups of the PAA 1 having the hydrophobicity. In addition, due to hydrophilicity of the carboxylate anions of the PAA 1, the carboxylate anions may not be absorbed on the carbonaceous coating layer 13, but may exhibit repulsion against other carboxylates of the PAA 1 that surrounds a neighboring metal-based core 11 on which a carbonaceous coating layer 13 is disposed. The particles of the negative active material, each of which includes the metal-based core 11 on which the carbonaceous coating layer 13 is formed, may be evenly dispersed within the negative electrode slurry composition without being aggregated to each other.

Figure 2:
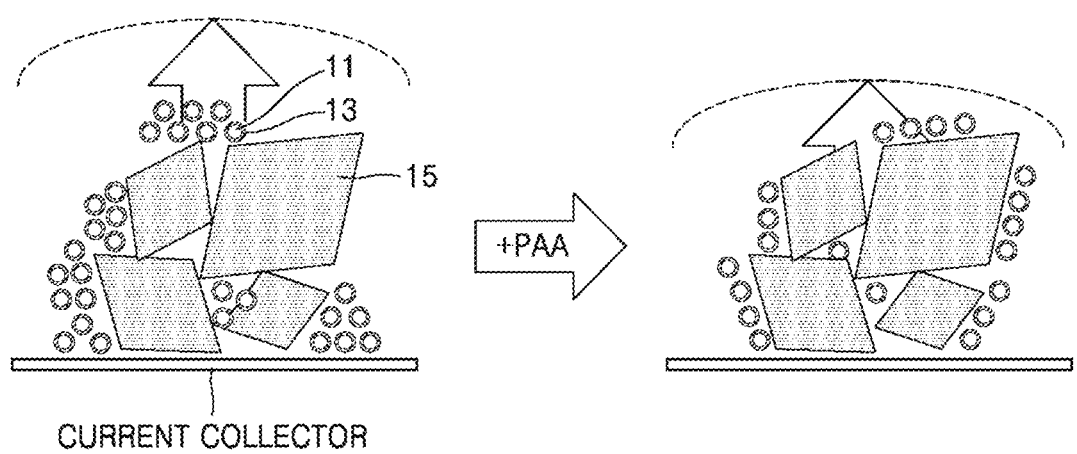
FIG. 2 illustrates a schematic view depicting expansion reduction effects on a negative active material through enhanced dispersibility of the PAAs.

FIG. 2 illustrates a schematic view depicting expansion reduction effects on a negative active material through the enhanced dispersibility of the PAA according to an exemplary embodiment. As shown in FIG. 2, in a case where the PAA is not included, the particles of the negative active material, each of which includes the metal-based core 11 on which the carbonaceous coating layer 13 is disposed, may be aggregated to each other. Then, these aggregated particles of the negative active material may significantly expand a volume thereof according to repeated charging and discharging. On the other hand, in a case where the PAA is included, the PAA may help with effective dispersion of the particles of the negative active material, each of which includes the metal-based core 11 on which the carbonaceous coating layer 13 is disposed, according to the dispersion as illustrated in FIG. 1. In this regard, the PAA may be positioned between gaps in a carbonaceous material 15, such that the volume expansion that occurs during charging and discharging may be decreased, thereby improving battery characteristics including lifespan characteristics.

The metal-based core 11 may be at least one selected from Si, $SiO_x$ (0<x<2), a Si—Y alloy (where Y in formula Si—Y is a variable representing an alkali metal, an alkali earth metal, a Group 13 element, a Group 14 element, a transition metal, a rare earth metal, or a combination thereof, and is not Si), Sn, $SnO_2$, a Sn—Y alloy (where Y in formula Sn—Y is a variable representing an alkali metal, an alkali earth metal, a Group 13 element, a Group 14 element, a transition metal, a rare earth metal, or a combination thereof, and is not Sn), and a combination thereof. For example, the variable Y as used in formulas Si—Y and Sn—Y above may represent magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof. For example, the metal-based core 11 may include Si.

The metal-based core 11 may have an average particle diameter of 1 μm or less. Within this range, such nano-sized particles may be surrounded by the PAA to thereby decrease the volume expansion in an efficient manner. For example, the metal-based core 11 may have an average particle diameter in a range of, e.g., about 10 nm to about 300 nm.

The term "average particle diameter" of the metal-based core 11 refers to a particle size distribution "D50", which is the value of the particle diameter at 50% in the cumulative distribution curve if the number of total particles is considered to be 100%, the cumulative distribution curve showing particle sizes from the smallest particles to largest particles. D50 may be measured by a suitable method. For example, D50 may be measured using a particle size analyzer, or by transmission electron microscopy (TEM) imaging or scanning electron microscopy (SEM) imaging. Moreover, D50 may be easily measured by analyzing data measured by a measuring device which uses a dynamic light-scattering method to count the number of particles that correspond to each particle size range. Then, the counted number may be calculated so as to obtain the average particle diameter.

The carbonaceous coating layer 13 disposed on the metal-based core 11 may include an amorphous carbon. The amorphous carbon may be formed from soft carbon, hard carbon, mesophase pitch carbide, calcinated coke, nano-carbon fiber, or a mixture thereof.

The carbonaceous coating layer 13 may have a thickness in a range from about 1 nm to about 200 nm. Within this range, the carbonaceous coating layer 13 may provide a sufficiently conductive pathway without causing the degradation of the battery capacity.

A method of coating using the carbonaceous coating layer 13 may include, for example, a dry coating method, a wet coating method, or both methods in combination. For example, chemical vapor deposition (CVD) and evaporation may be used as the dry coating method, and impregnation and spraying may be used as the wet coating method. When the wet coating method is used, dimethyl sulfoxide (DMSO) or tetrahydrofuran (THF) may be used as a solvent.

In addition, the carbonaceous coating layer 13 may be prepared by coating the metal-based core 11 with a carbon precursor, followed by heating at a temperature in a range from about 400° C. to about 1200° C. in an inert atmosphere such as argon or nitrogen for about 1 to about 10 hours. According to the heat treatment, the carbon precursor may be carbonized to an amorphous carbon, such that an amorphous carbon layer may be formed on the metal-based core. The carbon precursor may include, for example, mesophase pitch, coal-based pitch, petroleum-based pitch, coal-based oil, petroleum-based heavy distillate, or polymeric resin, such as polyimide resin, phenol resin, or furan resin.

The carbonaceous material may include a crystalline carbon, an amorphous carbon, or a combination thereof. The crystalline carbon may be, for example, amorphous, plate, flake, spherical, or fibrous natural graphite or artificial graphite. The amorphous carbon may be, for example, soft carbon, hard carbon, mesophase pitch carbide, or calcinated coke.

In the negative electrode slurry composition, the amount of the negative active material may be from about 50 wt % or about 99.5 wt % of the total weight of the negative electrode slurry composition. Within this range, the desired negative electrode capacity and lifespan characteristics may be obtained. For example, the amount of the negative active material may be from about 80 wt % to about 99 wt %, e.g., about 80 wt % to about 95%, of the total weight of the negative electrode slurry composition.

The total amount of the metal-based core and the carbonaceous coating layer 13 included in the negative active material may be from about 1 wt % to about 99 wt % of the total weight of the negative electrode slurry composition. Within this range, the desired battery capacity may be obtained and the volume expansion may be controlled. For example, the total amount of the metal-based core and the carbonaceous coating layer 13 may be from about 1 wt % to about 50 wt %, e,g., about 1 wt % to about 20 wt %, e.g., about 1 wt % to about 10 wt %, of the total weight of the negative electrode slurry composition.

As described above, in the negative electrode slurry composition, the PAA may surround the particles of the negative active material to help the dispersion of the particles. In this regard, the PAA may not act as a binder. Accordingly, a binder may be added to the negative electrode slurry composition.

In the negative electrode slurry composition, the binder may be selected from polyvinylidenefluoride (PVdF), polyvinylidenechloride, polybenzimidazole, polyimide, polyvinylacetate, polyacrylonitrile, polyvinylalcohol, carboxy methyl cellulose (CMC), starch, hydroxypropyl cellulose, reclaimed cellulose, polyvinylpyrrolidone, tetrafluoroethylene, polyethylene, polypropylene, polystyrene, poly(methyl methacrylate), polyaniline, acrylonitrile-butadiene styrene resin, phenol resin, epoxy resin, polyethylene terephthalate, polytetrafluoroethylene, poly(phenylene sulfide), polyamidimide, polyether imide, polyethylene sulfone, polyamide, polyacetal, poly(phenylene oxide), polybutylene terephthalate, ethylene propylene diene monomer (EPDM), sulfonated EPDM, styrene-butadiene rubber (SBR), fluoro rubber, and a combination thereof. For example, a binder having excellent binding properties may be dispersed in an aqueous solution, and may be used in combination with environmentally friendly SBR and CMC.

In the negative electrode slurry composition, the amount of the binder may be from about 0.1 wt % to about 20 wt % of the total weight of the negative electrode slurry composition. Within this range, the negative active materials may combine with each other without causing degradation of the battery properties. The negative electrode mixture layer may adhere to a surface of a current collector.

The negative electrode slurry composition may further include a conductive material. The conductive material may provide a conductive pathway to the negative active material to further improve electrical conductivity. A suitable conductive material that is used as a conductive material in a lithium battery may be used as the conductive material. Examples of the conductive material include a carbonaceous material, such as carbon black, acetylene black, Ketjen black, and carbon fiber (e.g., vapor grown carbon nanofiber); a metal-based material, such as metal powder or metal fiber formed by using copper, nickel, aluminum, or silver; a conductive polymer, such as a polyphenylene derivative; or a combination thereof. The amount of the conductive material may be appropriately adjusted. For example, the weight ratio of the sum of the negative active material to the conductive material may be from about 99:1 to about 90:10.

The negative electrode slurry composition may further include a solvent. N-methylpyrrolidone (NMP), acetone, or water may be used as the solvent, as examples. A suitable material that is used as a solvent in the art may be used. The amount of the solvent may be from about 1 part by weight to about 10 parts by weight based on 100 parts by weight of the negative active material. Within this range, an active material layer may be easily formed.

The negative electrode slurry may be prepared as follows. The negative active material, the binder, the dispersant, and the conductive material may be mixed together. A solvent may be added thereto to prepare the negative electrode slurry composition.

A negative electrode according to another aspect may include a negative electrode mixture layer, which is formed by using the negative electrode composition slurry, and a current collector.

A negative electrode mixture may be obtained by drying the negative electrode slurry composition. The term "negative electrode mixture" may refer to a mixture of the negative active material, the binder, the dispersant, and the conductive material. The negative electrode mixture may include all components that are added to the negative electrode slurry composition.

The current collector may be formed to have a thickness in a range from, for example, about 3 µm to about 500 µm. The current collector may be a suitable conductive material that does not cause adverse chemical changes in the manufactured battery. Examples of the current collector include copper, stainless steel, aluminum, nickel, titanium, sintered carbon, a copper surface or a stainless steel surface that is treated with carbon, nickel, titanium, or silver, or a aluminum-cadmium alloy. In addition, fine irregularities may be included on the surface of the current collector, so as to enhance adhesion of the negative active material to the surface of the current collector. The current collector may have various forms including films, sheets, foils, nets, porous structures, foams, or non-woven fabrics.

The negative electrode may be, for example, prepared by using the negative electrode slurry that is molded in a predetermined shape or that is coated on the current collector.

The negative electrode slurry composition is prepared. In consideration of preparation workability, the negative electrode slurry composition may be mixed with water or a solvent. The negative electrode slurry composition may be directly coated onto the current collector to prepare a negative electrode plate on which the negative electrode mixture layer is formed. In other implementations, the negative electrode slurry composition may be cast onto a separate support, and then, the current collector may be laminated with a film exfoliated from the support to prepare a negative electrode plate on which the negative electrode mixture layer is formed. The negative electrode may be in a form other than the above-described forms.

The negative electrode slurry composition may be used in the preparation of a negative electrode of a lithium battery. In an implementation, the negative electrode slurry composition may be printed onto a flexible electric substrate to prepare a printable battery.

A lithium battery according to another aspect may include the negative electrode; a positive electrode facing the negative electrode; and an electrolyte disposed between the negative electrode and the positive electrode.

A negative electrode may be prepared according to a preparation method of the negative electrode.

Separately, to prepare a positive electrode, a positive active material, a conductive material, a binder, and a solvent may be mixed together to form a positive electrode slurry composition.

A suitable material for use as a positive active material may be used in the positive active material. For example, the material represented by a Formula selected from the group of $Li_aA_{1-b}B_bD_2$ (0.90≤a≤1 and 0≤b≤0.5); $Li_aE_{1-b}B_bO_{2-c}D_c$ (0.90≤a≤1, 0≤b≤0.5, and 0≤c≤0.05); $LiE_{2-b}B_bO_{4-c}D_c$ (0≤b≤0.5 and 0≤c≤0.05); $Li_aNi_{1-b-c}Co_bB_cD_\alpha$ (0.90≤a≤1, 0≤b≤0.5, 0≤c≤0.05, and 0<α≤2); $Li_aNi_{1-b-c}Co_bB_cO_{2-\alpha}F_\alpha$ (0.90≤a≤1, 0≤b≤0.5, 0≤c≤0.05, and 0<α<2); $Li_aNi_{1-b-c}Co_bB_cO_{2-\alpha}F_2$ (0.90≤a≤1, 0≤b≤0.5, 0≤c≤0.05, and 0<α<2); $Li_aNi_{1-b-c}Mn_bB_cD_\alpha$ (0.90≤a≤1, 0≤b≤0.5, 0≤c≤0.05, and 0<α≤2); $Li_aNi_{1-b-c}Mn_bB_cO_{2-\alpha}F_\alpha$ (0.90≤a≤1, 0≤b≤0.5, 0≤c≤0.05, and 0<α<2); $Li_aNi_{1-b-c}Mn_bB_cO_{2-\alpha}F_2$ (0.90≤a≤1, 0≤b≤0.5, 0≤c≤0.05, and 0<α<2); $Li_aNi_bE_cG_dO_2$ (0.90≤a≤1, 0≤b≤0.9, 0≤c≤0.5, and 0.001≤d≤0.1); $Li_aNi_bCo_cMn_dG_eO_2$ (0.90≤a≤1, 0≤b≤0.9, 0≤c≤0.5, 0≤d≤0.5, and 0.001≤e≤0.1); $Li_aNiG_bO_2$ (0.90≤a≤1 and 0.001≤b≤0.1); $Li_aCoG_bO_2$ (0.90≤a≤1 and 0.001≤b≤0.1); $Li_aMnG_bO_2$ (0.90≤a≤1 and 0.001≤b≤0.1); $Li_aMn_2G_bO_4$ (0.90≤a≤1 and 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$ may be used:

In the Formulas above, the letters A, B, D, E, F, G, Q, I, and J represent variables, as further defined. In particular, the letter A refers to nickel (Ni), cobalt (Co), manganese (Mn), or a combination thereof; the letter B refers to aluminum (Al), Ni, Co, Mn, chromium (Cr), iron (Fe), Mg, strontium (Sr), vanadium (V), a rare earth metal element, or a combination thereof; the letter D refers to oxygen (O), fluorine (F), sulfur (S), phosphorus (P), or a combination thereof; the letter E refers to Co, Mn, or a combination thereof; the letter F refers to fluorine (F), S, P, or a combination thereof; the letter G refers to Al, Cr, Mn, Fe, Mg, lanthanum (La), cerium (Ce), Sr, V, or a combination thereof; the letter Q refers to Ti, molybdenum (Mo), Mn, or a combination thereof; the letter I refers to Cr, V, Fe, Sc, Y, or a combination thereof; and the letter J refers to V, Cr, Mn, Co, Ni, Cu, or a combination thereof.

For example, the positive active material may be $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), or $FePO_4$.

The positive active material may include a coating layer that is formed on a surface of the material, or may include a mixture of the material and the material having a coating layer thereon. The coating layer may include a coating element compound selected from the group of oxides of the coating element, hydroxides of the coating element, oxyhydroxides of the coating element, oxycarbonates of the coating element, or hydroxycarbonates of the coating element. The compound forming the coating layer may be either amorphous or crystalline. The coating element included in the coating layer may be selected from Mg, Al, Co, potassium (K), sodium (Na), calcium (Ca), silicon (Si), Ti, V, Sn, Ge, gallium (Ga), boron (B), arsenic (As), Zr, or a mixture thereof. The formation of the coating layer may be performed according to a suitable method (e.g., spray coating, immersing, etc) using these elements with the positive active material, so long as the method does not cause any undesirable side effect regarding properties of the positive active material.

The positive electrode slurry composition may include the same conductive material, binder, and solvent as those included in the negative electrode slurry composition. According to circumstances, the positive electrode slurry composition and negative electrode slurry composition may further include a plasticizer to form pores inside electrode plates. The amounts of the active material, the conductive material, the binder, and the solvent may be suitable levels used for a lithium battery.

A positive electrode current collector may be formed to have a thickness in a range from, for example, about 3 μm to about 500 μm. The current collector may be a suitable conductive current collector that does not cause adverse chemical changes in the manufactured battery. Examples of the positive electrode current collector include copper, stainless steel, aluminum, nickel, titanium, sintered carbon, a copper surface or a stainless steel surface that is treated with carbon, nickel, titanium, or silver, or aluminum-cadmium alloys. Fine irregularities may be included on the surface of the positive electrode current collector, so as to enhance adhesion of the positive electrode active material to the surface of the positive electrode current collector. The positive electrode current collector may be used in various forms including films, sheets, foils, nets, porous structures, foams, and non-woven fabrics.

The positive electrode slurry composition may be directly coated onto the positive electrode current collector to prepare a positive electrode plate on which the positive electrode mixture layer is formed. In other implementations, the positive electrode slurry composition may be cast onto a separate support, and then, the current collector may be laminated with a film exfoliated from the support to prepare a positive electrode plate on which the positive electrode mixture layer is formed. The positive electrode may be in a form other than the above forms.

The positive electrode and the negative electrode may be separated from each other by a separator. A suitable material for use as a separator may be used. A material having a low resistance to ion migration of an electrolyte and excellent electrolyte absorptivity may be used. For example, the separator may be a material selected from glass fiber, polyester, Teflon, polyethylene, polypropylene, polytetrafluoroethylene, and a combination thereof. For example, the separator may be in the form of felt or woven fabric. For example, a separator having a pore diameter from about 0.01 μm to about 10 μm and a thickness from about 5 μm to about 300 μm may be used as the separator.

The electrolyte may include a non-aqueous electrolyte and a lithium salt. As the non-aqueous electrolyte, a non-aqueous electrolyte solution, an organic solid electrolyte, or an inorganic solid electrolyte may be used.

As the non-aqueous electrolyte solution, an aprotic organic solvent, for example, N-methyl-2-pyrrolidinone, propylene carbonate (PC), ethylene carbonate (EC), butylene carbonate, dimethyl carbonate (DMC), diethyl carbonate (DEC), gamma-butyrolactone (GBL), 1,2-dimethoxy ethane (DME), tetrahydrofuran (THF), 2-methyl tetrahydrofuran, dimethylsulfoxide (DMSO), 1,3-dioxolane (DOL), formamide, dimethylformamide, acetonitrile, nitromethane, methyl formate, methyl acetate, phosphate triester, trimethoxy methane, dioxolane derivatives, sulfolane, methyl sulfolane, 1,3-dimethyl-2-imidazolidinone, a propylene carbonate derivative, a THF derivative, ether, methyl propionate, or ethyl propionate may be used.

As the organic solid electrolyte, for example, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers including an ionic dissociation group may be used.

As the inorganic solid electrolyte, a nitride, a halide, or a sulfate of lithium, for example, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$, may be used.

A suitable lithium salt for a lithium battery may be used as the lithium salt. As a material that is readily dissolved in the non-aqueous electrolyte, at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic carboxylic acid lithium, 4-phenyl lithium borate, and imides may be used.

In addition, in consideration of the improvement in the charge and discharge characteristics and flame retardancy of the battery, the electrolyte solution may include, for example, pyridine, triethyl phosphate, triethanolamine, cyclic ether, ethylenediamine, n-glyme, hexaphosphate triaminde, nitrobenzene derivatives, sulfur, quinone imine dyes, N-substituted oxazolidinone, N,N-substituted imidazolidine, ethylene glycol dialkylether, ammonium salt, pyrrole, 2-methoxyethanol, or trichloroaluminum. In some implementations, the electrolyte solution may further include a halogen-containing solvent, such as carbon tetrachloride and trifluoroethylene, to impart incombustibility, or may further include carbon dioxide gas to improve preserving characteristics at a high temperature in the electrolyte. The electrolyte solution may further include fluoro-ethylene carbonate (FEC), propene sultone (PRS), or the like.

For example, a lithium salt, such as $LiPF_6$, $LiClO_4$, $LiBF_4$, and $LiN(SO_2CF_3)_2$, may be added to a mixed solvent including a cyclic carbonate of EC or PC, which is a highly dielectric solvent, and a linear carbonate of DEC, DMC, or EMC, which is a low viscosity solvent to prepare the electrolyte.

The lithium battery may be a lithium ion battery, a lithium ion polymer battery, or a lithium polymer battery, classified according to the types of the separator and the electrolyte being used, a cylindrical battery, a rectangular battery, a coin-shape battery, or a pouch-shape battery, classified according to the shape of the separator and the electrolyte being used; or a bulky battery or a thin-film type battery, classified according to the size of the separator and the electrolyte being used.

A suitable method of manufacturing the lithium battery may be used.

Figure 3:
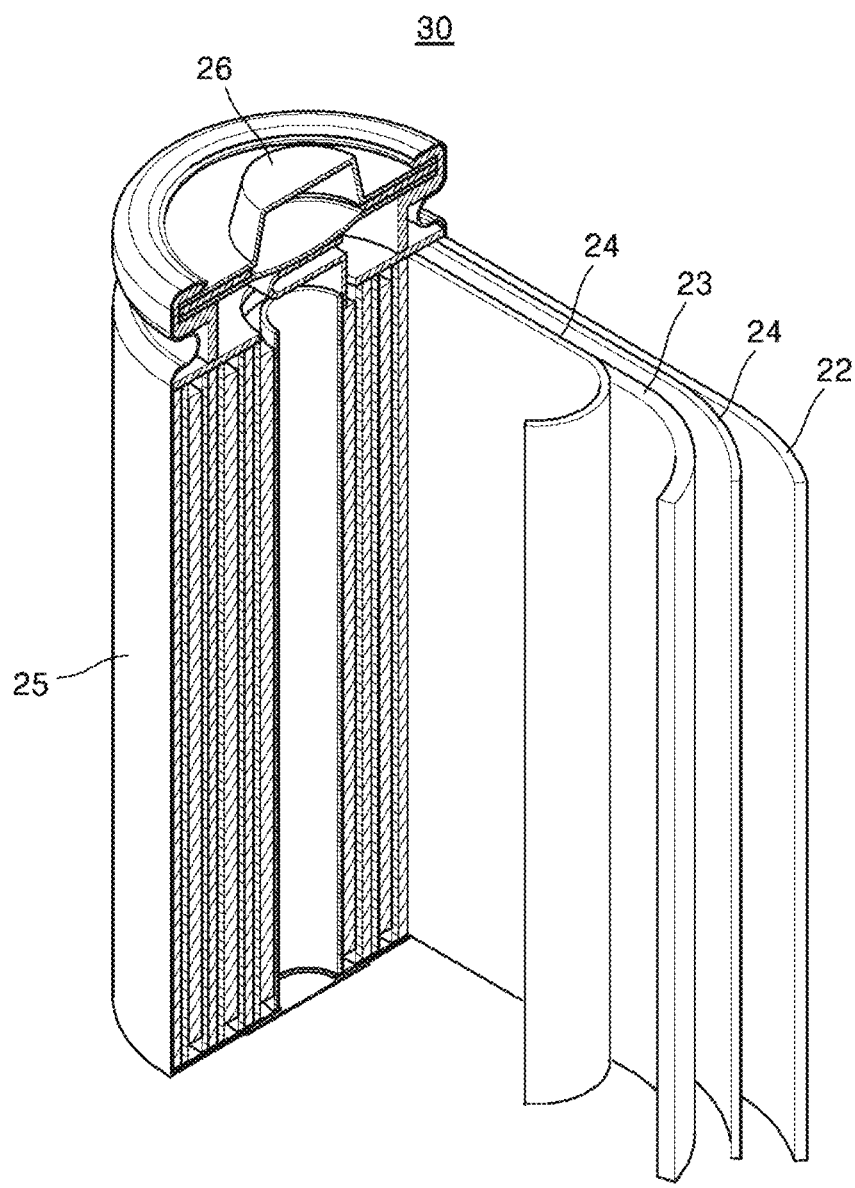
FIG. 3 illustrates a schematic view depicting a cross-sectional view of an electrode.

FIG. 3 illustrates a schematic view depicting a representative structure of a lithium battery 30.

Referring to FIG. 3, the lithium battery 30 includes a positive electrode 23, a negative electrode 22, and a separator 24 disposed between the positive electrode 23 and the negative electrode 22. The positive electrode 23, the negative electrode 22, and the separator 24 may be wound or folded to be placed in a battery case 25. An electrolyte may be injected into the battery case 25 and the resultant structure may be sealed with an encapsulation member 26, thereby completing the manufacturing of the lithium battery 30. The battery case 25 may be cylindrical, rectangular, or thin-film shaped. The lithium battery may be a lithium ion battery.

The lithium battery may be suitable for electric vehicles requiring a high capacity battery, a high-power output, and high temperature operation, in addition to existing mobile phones and portable computers. The lithium battery may be combined with a typical internal combustion engine, a fuel battery, or a super capacitor for use in hybrid vehicles. In addition, the lithium battery may be suitable for other uses requiring high output, high voltage, and high temperature operation.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

1) Preparation of Negative Electrode Slurry Composition and Negative Electrode

Si particles having an average particle diameter of 150 nm and petroleum pitch were mixed and heat-treated at a temperature of about 900° C. for about 6 hours in an $N_2$ atmosphere, thereby obtaining Si particles on which a carbonaceous coating layer was formed. The thickness of the carbonaceous coating layer was about 50 nm.

The Si particles on which a carbonaceous coating layer was formed and graphite (a product of Mitsubishi Chemical. Co.) were prepared as negative active materials, a polyacrylic acid (PAA) having a weight-average molecular weight of 5,000 was prepared as a dispersant, and styrene-butadiene rubber (SBR) and carboxy methyl cellulose (CMC) were prepared as binders.

Then, the Si particles on which a carbonaceous coating layer, the graphite, the SBR, the CMC, and the PAA were mixed at a weight ratio of 7.8:89.2:1.5:1.2:0.3 in water, thereby preparing a negative electrode slurry composition. The amount of water was neglected when considering components of the negative electrode slurry composition.

A copper current collector having a thickness of 10 μm was coated with the negative electrode slurry composition by a general method to form a negative electrode plate. The plate where the coating was completed was dried at a temperature of 110° C. for 15 minutes, and then, rolled to prepare the negative electrode plate having a density of 1.5 g/cc. The dried negative electrode plate was heat-treated at a temperature of 350° C. in a vacuum atmosphere for 1 hour, and then, was cut into a size of 16 mm, thereby preparing a negative electrode to be applied to a coin cell.

2) Preparation of Positive Electrode Slurry Composition and Positive Electrode

Li[$Ni_{0.80}Co_{0.10}Al_{0.10}$]$O_2$ powder (a product of Toda Company) was prepared as a positive active material, PVDF was prepared as a binder, carbon black was prepared as a conductive material, and NMP was prepared as a solvent. Then, the positive active material, the binder, and the conductive material were mixed at a weight ratio of 98:1:1, thereby preparing a positive electrode slurry composition. A positive electrode was prepared by using the positive electrode slurry composition according to the same method used to prepare the negative electrode.

3) Preparation of Lithium Secondary Battery

The negative electrode, the positive electrode, and a polypropylene separator having a thickness of 20 μm (Celgard 3501) were used in preparing a lithium secondary battery structure. An electrolyte was injected into the lithium secondary battery structure, and then, the structure was compressed to prepare a lithium battery structure according to a 2016 standard. The electrolyte was prepared by dissolving $LiPF_6$ in a mixed solution of EC, DEC, and fluoroethylene carbonate (FEC) (wherein the volumetric ratio of EC:DEC:FEC was 5:70:25.) to provide a $LiPF_6$ concentration of 1.10 M in the mixed solution.

Example 2

A negative electrode, a positive electrode, and a lithium secondary battery were prepared by using the same method as that of Example 1, except that the Si particles on which a carbonaceous coating layer was formed, the graphite, the SBR, the CMC, and the PAA were mixed at a weight ratio of 7.8:89.2:1.5:0.9:0.6.

Example 3

A negative electrode, a positive electrode, and a lithium secondary battery were prepared by using the same method as that of Example 1, except that the Si particles on which a carbonaceous coating layer was formed, the graphite, the SBR, the CMC, and the PAA having a weight-average molecular weight of 2,000 were mixed at a weight ratio of 7.8:89.2:1.5:1.2:0.3.

Example 4

A negative electrode, a positive electrode, and a lithium secondary battery were prepared by using the same method as that of Example 1, except that the Si particles on which a carbonaceous coating layer was formed, the graphite, the SBR, the CMC, and the PAA having a weight-average molecular weight of 2,000 were mixed at a weight ratio of 7.8:89.2:1.5:0.9:0.6.

Example 5

A negative electrode, a positive electrode, and a lithium secondary battery were prepared by using the same method as that of Example 1, except that the Si particles on which a carbonaceous coating layer was formed, the graphite, the SBR, the CMC, and the PAA having a weight-average molecular weight of 2,000 were mixed at a weight ratio of 7.8:89.2:1.5:0.6:0.9.

Example 6

A negative electrode, a positive electrode, and a lithium secondary battery were prepared by using the same method as that of Example 1, except that the Si particles on which a carbonaceous coating layer was formed, the graphite, the SBR, the CMC, and the PAA having a weight-average molecular weight of 2,000 were mixed at a weight ratio of 7.8:89.2:1.5:0.3:1.2.

Example 7

A negative electrode, a positive electrode, and a lithium secondary battery were prepared by using the same method as that of Example 1, except that the Si particles on which a carbonaceous coating layer was formed, the graphite, the SBR, and the PAA having a weight-average molecular weight of 2,000 were mixed at a weight ratio of 7.8:89.2:1.5:1.5.

Comparative Example 1

A negative electrode, a positive electrode, and a lithium secondary battery were prepared by using the same method as that of Example 1, except that the Si particles on which a carbonaceous coating layer was formed, the graphite, the SBR, and the CMC were mixed at a weight ratio of 7.8:89.2:1.5:1.5.

Comparative Example 2

A negative electrode, a positive electrode, and a lithium secondary battery were prepared by using the same method as that of Example 1, except that the Si particles on which a carbonaceous coating layer was formed, the graphite, the SBR, the CMC, and the PAA having a weight-average molecular weight of 10,000 were mixed at a weight ratio of 7.8:89.2:1.5:1.2:0.3.

Comparative Example 3

A negative electrode, a positive electrode, and a lithium secondary battery were prepared by using the same method as that of Example 1, except that the Si particles on which a carbonaceous coating layer was formed, the graphite, the SBR, the CMC, and the PAA having a weight-average molecular weight of 10,000 were mixed at a weight ratio of 7.8:89.2:1.5:0.9:0.6.

Comparative Example 4

A negative electrode, a positive electrode, and a lithium secondary battery were prepared by using the same method as that of Example 1, except that the Si particles on which a carbonaceous coating layer was formed, the graphite, the SBR, the CMC, and an ammonium salt of polycarboxylic acid as an anionic high molecular weight surfactant (CO-EXEL DS-1520, San Nopco Korea, Ltd.) were mixed at a weight ratio of 7.8:89.2:1.5:1.25:0.25.

Evaluation Example 1: Evaluation of Dispersibility of Negative Active Material

Figure 4A:
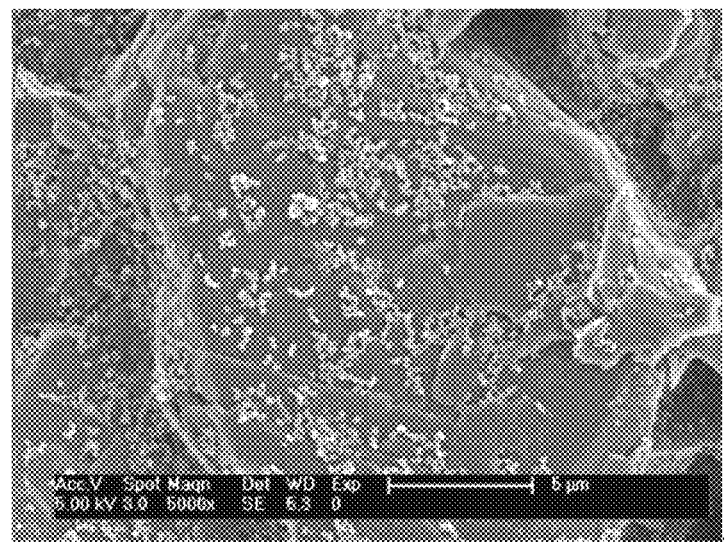
FIG. 4A illustrates a scanning electron microscopy (SEM) image showing a negative electrode of Example 1 measured at a magnification of 5,000.
Figure 4B:
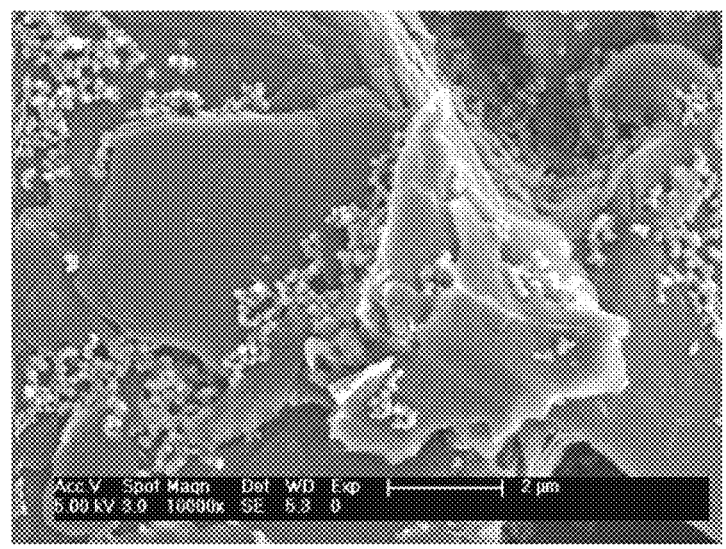
FIG. 4B illustrates an SEM image showing a negative electrode of Example 1 measured at a magnification of 10,000.
Figure 5A:
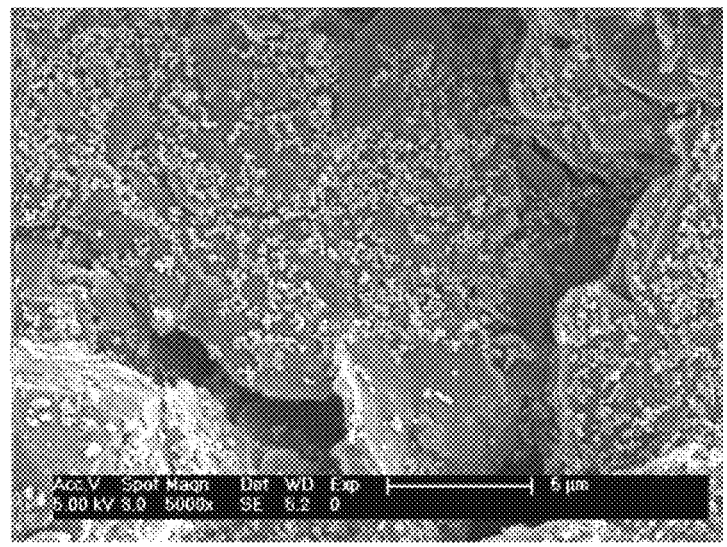
FIG. 5A illustrates an SEM image showing a negative electrode of Example 2 measured at a magnification of 5,000.
Figure 5B:
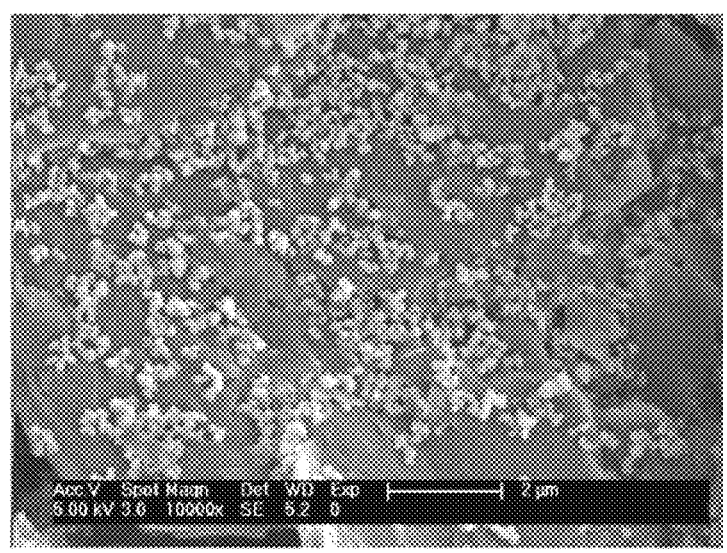
FIG. 5B illustrates an SEM image showing a negative electrode of Example 2 measured at a magnification of 10,000.
Figure 6A:
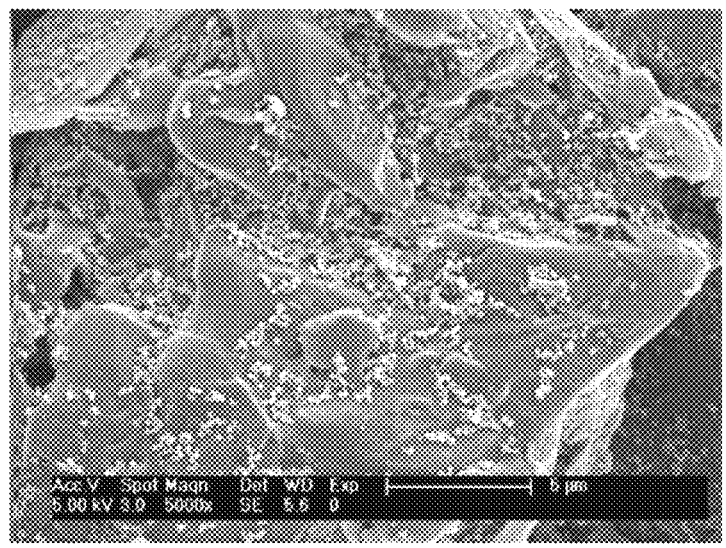
FIG. 6A illustrates an SEM image showing a negative electrode of Comparative Example 1 measured at a magnification of 5,000.
Figure 6B:
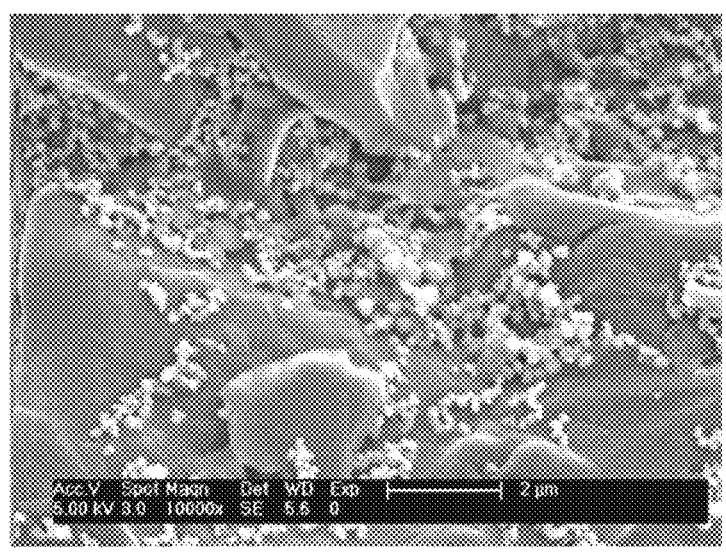
FIG. 6B illustrates an SEM image showing a negative electrode of Comparative Example 1 measured at a magnification of 10,000.

To confirm the dispersibility of the negative active material in the negative electrode slurry composition, scanning electron microscopy (SEM) images of the negative electrodes of Examples 1 and 2 and Comparative Example 1, respectively, were shown in FIG. 4 (FIG. 4A illustrates an SEM image at a magnification of 5,000, and FIG. 4B illustrates an SEM image at a magnification of 10,000), FIG. 5 (FIG. 5A illustrates an SEM image at a magnification of 5,000 and FIG. 5B illustrates an SEM image at a magnification of 10,000), and FIG. 6 (FIG. 6A illustrates an SEM image at a magnification of 5,000 and FIG. 6B illustrates an SEM image at a magnification of 10,000), respectively.

In comparison to the negative electrode of Comparative Example 1 prepared without including the PAA as a dispersant, it was confirmed, as shown by comparing FIGS. 4A and 6A, that the negative electrode of Example 1 prepared by including the PAA as a dispersant had the dispersed Si particles on which a carbonaceous coating layer was formed, without aggregation. In addition, in comparison to the negative electrode of Example 1 (as shown in FIG. 4A), it was confirmed, as shown in FIG. 5A, that the negative electrode of Example 2 having a large amount of the PAA showed better dispersibility of the Si particles on which a carbonaceous coating layer was formed.

Moreover, as shown in FIGS. 4B, 5B, and 6B, which are respectively enlarged views of FIGS. 4A, 5A, and 6A, it was confirmed that the negative electrodes of Examples 1 and 2 had less aggregation of the Si particles as compared to the negative electrode of Comparative Example 1. In particular, as shown in FIG. 5B, the Si particles were evenly dispersed over the entire graphite particles, indicating that the negative electrode of Example 2 had better dispersibility due to the inclusion of the PAA.

Evaluation Example 2: Evaluation of Volume Expansion of Battery

The coin cells of Examples 1 and 2 and Comparative Examples 1 to 4 were charged at a 0.1 C rate (formation process). Then, the coin cells were disassembled to compare the thickness of the negative electrodes before the charging with the thickness of the negative electrodes after the charging, so as to measure the volume expansion of the coin cells. The results are shown in FIGS. 7 and 8.

Figure 7:
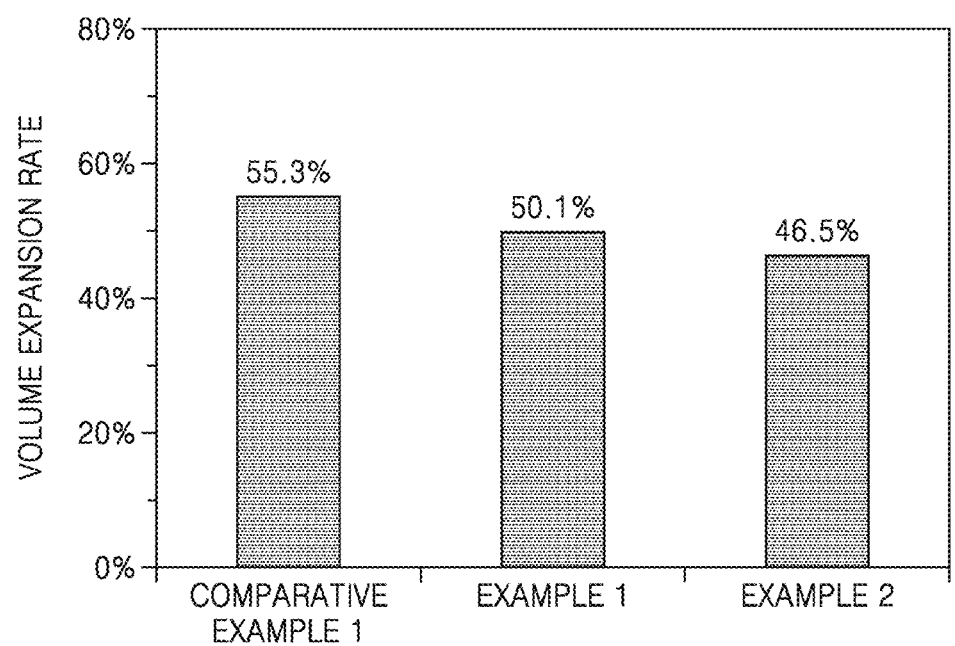
FIG. 7 illustrates a graph showing volume expansion rates of coin cells of Comparative Examples 1 and 2.

As shown in FIG. 7, it can be seen that the volume expansion rate of the batteries of Examples 1 and 2 prepared by including the PAA was less compared to the volume expansion rate of the battery of Comparative Example 1. That is, in the batteries of Examples 1 and 2, it is deemed that the PAA was physically adsorbed on a surface of the nano-sized Si particles to thereby surround the Si particles, and in this regard, the aggregation of the particles may be prevented and the volume expansion upon the charging may be suppressed. In addition, as confirmed above, the battery of Example 2 including the PAA in a high amount for better dispersibility was capable of suppressing the volume expansion as compared to the battery of Example 1.

Figure 8:
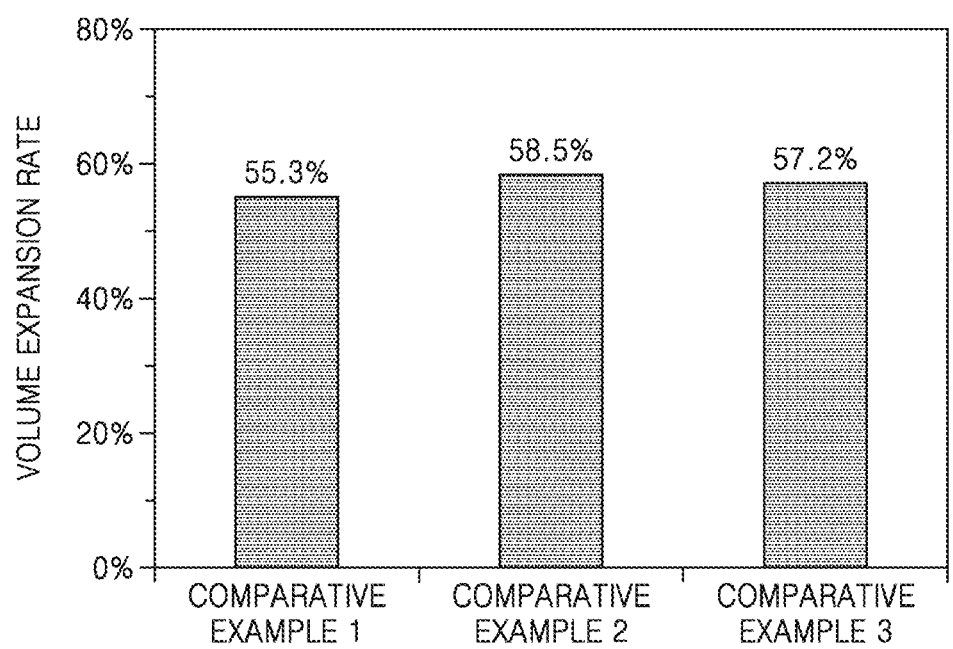
FIG. 8 illustrates a graph showing volume expansion rates of coin cells of coin cells of Comparative Examples 1 to 3.

As shown in FIG. 8, it was confirmed that the batteries of Comparative Examples 2 and 3 prepared by including the PAA having a weight-average molecular weight of 10,000 had an increased volume expansion rate than that of the battery of Comparative Example 1. In particular the results indicate that the PAA having a molecular weight that is not within the range according to embodiments may serve as a binder, indicating that the PAA serving as a binder fails to suppress the volume expansion upon the charging.

Figure 9:
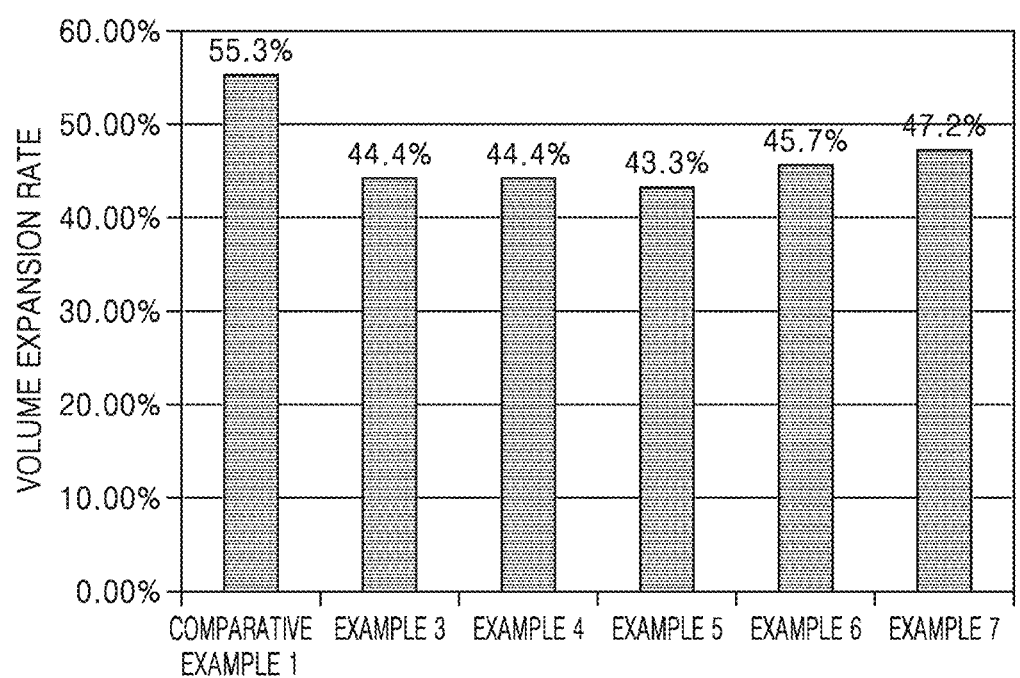
FIG. 9 illustrates a graph showing volume expansion rates of coin cells of coin cells of Comparative Example 1 and Examples 3 to 7.

As shown in FIG. 9, it can be seen that the batteries of Examples 3 to 7 prepared by including the PAA having a weight-average molecular weight of 2,000 had a decreased volume expansion rate compared to that of the battery of Comparative Example 1. In particular, the inclusion of the PAA in an appropriate amount in the batteries of Examples 5 and 6 showed excellent effects in reducing the volume expansion rate.

Evaluation Example 3: Evaluation of Lifespan Characteristics of Cell

Figure 10:
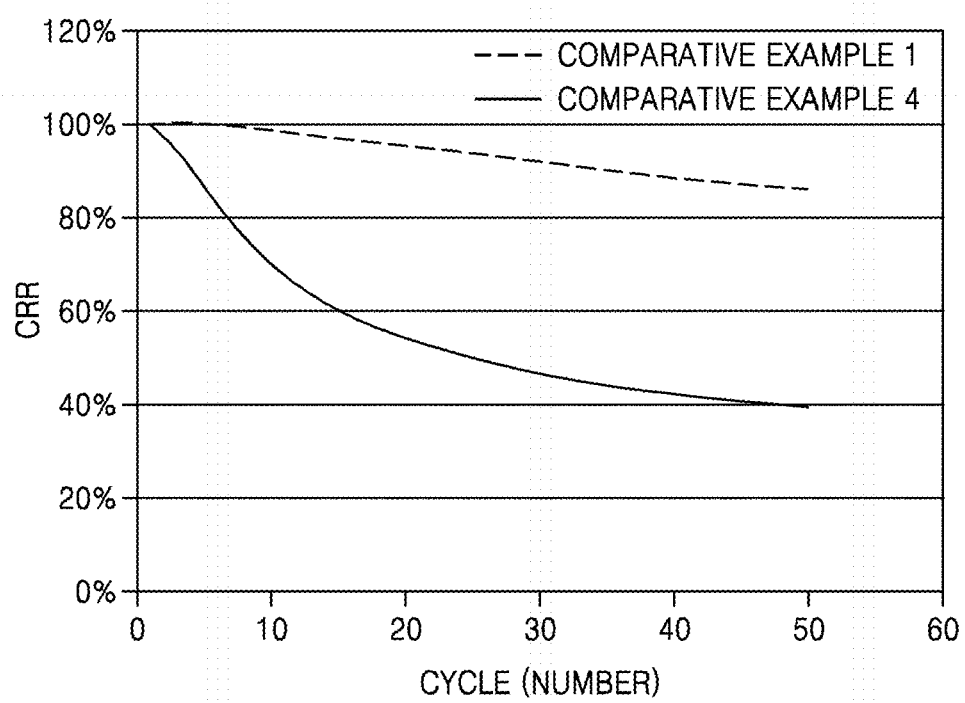
FIG. 10 illustrates a graph showing capacity retention rates of coin cells of Comparative Examples 1 and 4 measured at each charge/discharge cycle.

The coin cells of Comparative Examples 1 and 4 and Examples 1 to 7 were charged at a 1.0 C rate, and then, discharged at a 1.0 C rate, to thereby analyze a capacity retention ratio (CRR) of the coin cells. The CRR of the coin cells was measured at each cycle, and the results are shown in FIGS. 10 to 12. Here, the CRR is defined by Mathematical Formula 1 below:

Capacity retention ratio (CRR) [%]=[Discharge capacity at each cycle/Discharge capacity at the first cycle]×100        Mathematical Formula 1

The CRR of the coin cells of Comparative Examples 1 and 4 was measured at the 50$^{th}$ cycle, and the results are shown in Table 1 below.

TABLE 1

|  | Dispersant (wt %) | CRR at 50th cycle (%) |
|---|---|---|
| Comparative Example 1 | — | 86.5 |
| Comparative Example 4 | Ammonium salt of polycarboxylic acid (0.25) | 39.6 |

As shown in Table 1 and FIG. 10, the CRR of the lithium battery of Comparative Example 4 was significantly smaller than that of the lithium battery of Comparative Example 1 prepared without including a dispersant. That is, it is suggested that a typical surfactant was capable of improving the dispersibility of solid particles in a liquid by the absorption to the solid particles through interaction with ions or by sharing electrons. However, such a surfactant is also capable of causing electrochemical side reactions inside the battery, resulting in increasing the number of side reactions rather than improving the dispersion effects, and in this regard, a reduction in lifespan of the battery may be induced.

The CRR of the coin cells of Comparative Example 1 and Examples 1 and 2 was measured at the 50$^{th}$ cycle, and the results are shown in Table 2 below.

TABLE 2

|  | Dispersant (wt %) | CRR at 50th cycle (%) |
|---|---|---|
| Comparative Example 1 | — | 86.5 |
| Example 1 | PAA having a Mw of 5,000 (0.3) | 91.1 |
| Example 2 | PAA having a Mw of 5,000 (0.6) | 92.1 |

As shown in Table 2, the CRR of the lithium batteries of Examples 1 and 2 was greater than that of the lithium battery of Comparative Example 1, indicating that the cycle characteristics of the lithium batteries of Examples 1 and 2 were improved. It is suggested that, due to less volumetric changes in the lithium batteries of Examples 1 and 2 during the charging and discharging, the exfoliation of the negative active material from the negative electrode current collector occurred less frequently.

The CRR of the coin cells of Comparative Example 1 and Examples 3 to 7 was measured at the 50$^{th}$ cycle, and the results are shown in Table 3 below.

TABLE 3

|  | Dispersant (wt %) | CRR at 50th cycle (%) |
|---|---|---|
| Comparative Example 1 | — | 86.5 |
| Example 3 | PAA having a Mw of 2,000 (0.3) | 91.0 |
| Example 4 | PAA having a Mw of 2,000 (0.6) | 91.9 |
| Example 5 | PAA having a Mw of 2,000 (0.9) | 92.2 |
| Example 6 | PAA having a Mw of 2,000 (1.2) | 90.4 |
| Example 7 | PAA having a Mw of 2,000 (1.5) | 92.4 |

As shown in Table 3, the CRR of the lithium batteries of Examples 3 to 7 was greater than that of the lithium battery of Comparative Example 1, indicating that cycle characteristics of the lithium batteries of Examples 3 to 7 were improved. That is, it is deemed that, due to less volumetric changes in the lithium batteries of Examples 3 to 7 during the charging and discharging, the exfoliation of the negative active material from the negative electrode current collector occurred less frequently. In particular, the inclusion of the PAA in an appropriate amount in the batteries of Examples 3 to 7 showed excellent effects in improving the CRR.

By way of summation and review, a carbonaceous active material may be used as a negative active material of a lithium secondary battery. Examples of a carbonaceous material include crystalline carbons, such as graphite and artificial graphite, and amorphous carbons, such as soft carbon and hard carbon. However, these carbonaceous active materials may have a theoretical capacity of 380 mAh/g at most. Accordingly, the carbonaceous active materials may not be suitable for a high-capacity lithium battery.

To address the issue of providing a higher capacity, metals such as silicon, tin, aluminum, germanium, and lead, which may react with lithium to form an alloy, and alloys and composites that are related to the metals have been actively studied. A negative active material including such a non-carbonaceous material may intercalate and/or de-intercalate more lithium ions than a negative active material including a carbonaceous material. Thus, such materials may be considered in preparing a battery having high capacity and high energy density. For example, pure silicon is known to have a high theoretical capacity of 4,200 mAh/g.

However, when an inorganic particle used as a negative active material, e.g., silicon or tin, provides for the intercalation of lithium ions upon charging, the volume of the inorganic particle may be expanded up to about 300% to about 400%. Then, when the inorganic particle provides for the de-intercalation of lithium ions upon discharging, the volume of the inorganic particle may be reduced. Therefore, due to changes in the volume during charging and discharging, exfoliation of a negative active material from a negative electrode current collector may occur, resulting in rapid degradation of lifespan characteristics.

Embodiments provide a negative electrode slurry composition including a dispersant capable of improving lifespan characteristics of a lithium battery by improving dispersibility of a negative active material.

Embodiments also provide a negative electrode including the negative electrode slurry composition and a lithium battery including the negative electrode.

According to embodiments, a negative electrode slurry composition includes, as a dispersant, a polyacrylic acid having a weight-average molecular weight greater than 10 and less than 10,000 in a predetermined amount. The dispersibility of particles of a negative active material within the negative electrode slurry may be thereby improved. The aggregation of the particles of the negative active material may be prevented, so as to reduce the volume expansion rate of the negative active material during the charging. In addition, use of the negative electrode slurry composition in preparing a lithium battery may result in improvement of lifespan characteristics.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A negative electrode slurry composition, comprising:
    a negative active material;
    a binder; and
    a dispersant,
    wherein the dispersant includes a polyacrylic acid having a weight average molecular weight greater than 10 and less than 5,000, the polyacrylic acid being present in an amount of from about 0.01 wt % to about 0.3 wt % of the total weight of the negative electrode slurry composition.

2. The negative electrode slurry composition as claimed in claim 1, wherein the polyacrylic acid has a weight average molecular weight in a range from about 1,000 to less than 5,000.

3. The negative electrode slurry composition as claimed in claim 1, wherein the negative active material includes a metal-based core and a carbonaceous coating layer on the metal-based core.

4. The negative electrode slurry composition as claimed in claim 3, wherein:
    the metal-based core is at least one selected from Si, $SiO_x$, a Si—Y alloy, and a combination thereof,
    x in $SiO_x$ is in a range of $0<x<2$,
    Y in the Si—Y alloy is an alkali metal, an alkali earth metal, a Group 13 element, a Group 14 element, a transition metal, a rare earth metal, or a combination thereof, and is not Si, and
    Y' in the Sn—Y' alloy is an alkali metal, an alkali earth metal, a Group 13 element, a Group 14 element, a transition metal, a rare earth metal, or a combination thereof, and is not Sn.

5. The negative electrode slurry composition as claimed in claim 3, wherein the metal-based core includes silicon (Si).

6. The negative electrode slurry composition as claimed in claim 3, wherein an average particle diameter of the metal-based core is 1 μm or less.

7. The negative electrode slurry composition as claimed in claim 3, wherein an average particle diameter of the metal-based core is in a range from about 10 nm to about 300 nm.

8. The negative electrode slurry composition as claimed in claim 3, wherein the carbonaceous coating layer includes an amorphous carbon.

9. The negative electrode slurry composition as claimed in claim 3, wherein the negative active material further includes a carbonaceous material.

10. The negative electrode slurry composition as claimed in claim 1, wherein the negative active material is present in an amount of from about 50 wt % to about 99.5 wt % of a total weight of the negative electrode slurry composition.

11. The negative electrode slurry composition as claimed in claim 3, wherein a total amount of the metal-based core and the carbonaceous coating layer is in a range from about 1 wt % to about 99 wt % of the total weight of the negative electrode slurry composition.

12. A negative electrode, comprising:
    a negative electrode mixture layer that is formed from the negative electrode slurry composition as claimed in claim 1.

13. A lithium battery including the negative electrode as claimed in claim 12.

* * * * *